US009736374B2

(12) United States Patent
Wu

(10) Patent No.: US 9,736,374 B2
(45) Date of Patent: *Aug. 15, 2017

(54) VIDEO/VISION BASED ACCESS CONTROL METHOD AND SYSTEM FOR PARKING OCCUPANCY DETERMINATION, WHICH IS ROBUST AGAINST CAMERA SHAKE

(71) Applicant: Xerox Corporation, Norwalk, CT (US)

(72) Inventor: Wencheng Wu, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 531 days.

This patent is subject to a terminal disclaimer.

(21) Appl. No.: 14/031,128

(22) Filed: Sep. 19, 2013

(65) Prior Publication Data
US 2015/0077559 A1  Mar. 19, 2015

(51) Int. Cl.
*G06K 9/00* (2006.01)
*H04N 5/232* (2006.01)

(52) U.S. Cl.
CPC ..... *H04N 5/23267* (2013.01); *G06K 9/00771* (2013.01); *G06K 9/00812* (2013.01)

(58) Field of Classification Search
CPC .. G06K 9/00785; G06T 7/2053; G08G 1/017; G08G 1/0175; G08G 1/04; G08G 1/054; G08G 1/142; G08G 1/146; H04N 5/23248; H04N 5/23254
See application file for complete search history.

(56) References Cited

U.S. PATENT DOCUMENTS

| 5,218,442 A | * | 6/1993 | Hamada | H04N 5/23248 348/208.15 |
| 5,289,274 A | | 2/1994 | Kondo | |
| 5,438,360 A | * | 8/1995 | Edwards | H04N 5/23248 348/143 |

(Continued)

FOREIGN PATENT DOCUMENTS

| EP | 0 481 230 B1 | 1/1997 |
| EP | 0 707 229 B1 | 9/2001 |

(Continued)

OTHER PUBLICATIONS

Felzenszwalb, P.F. et al., "Object Detection with Discriminatively Trained Part Based Models," IEEE -Transactions on Pattern Analysis and Machine (2010) 32(9): 1627-1645.

*Primary Examiner* — Jay Patel
*Assistant Examiner* — Shadan E Haghani
(74) *Attorney, Agent, or Firm* — Kermit D. Lopez; Luis M. Ortiz; Ortiz & Lopez, PLLC

(57) ABSTRACT

Methods and systems for parking lot occupancy determination. Video of an entrance to a parking lot (or other facility) can be acquired utilizing one or more video cameras focusing on a pre-defined vision-based region of interest and a pre-defined video-based region of interest. The video can be video processed via a classifier that is pre-trained to take into account potential camera shake disturbances to generate video output data thereof. The video output data can then be trajectory smoothed. The video output data (following trajectory smoothing) can then be analyzed for parking lot occupancy data such that the impact of camera shake with respect to the video camera(s) is minimized to determine parking lot occupancy.

16 Claims, 7 Drawing Sheets

(56) References Cited

U.S. PATENT DOCUMENTS

| | | | |
|---|---|---|---|
| 5,673,149 A * | 9/1997 | Okada | G02B 27/646 359/557 |
| 5,764,163 A | 6/1998 | Waldman et al. | |
| 5,809,161 A * | 9/1998 | Auty | G01P 3/38 340/937 |
| 6,219,640 B1 * | 4/2001 | Basu | G06K 9/00221 704/231 |
| 6,285,297 B1 | 9/2001 | Ball | |
| 6,967,569 B2 | 11/2005 | Weber et al. | |
| 7,424,968 B2 | 9/2008 | Meyerhofer et al. | |
| 7,726,888 B2 | 6/2010 | Amira et al. | |
| 7,962,435 B2 | 6/2011 | Yu et al. | |
| 8,111,873 B2 * | 2/2012 | Berthilsson | G06K 9/00771 382/103 |
| 8,306,734 B2 | 11/2012 | Mathews | |
| 8,432,297 B2 | 4/2013 | Sonnabend et al. | |
| 8,514,290 B2 | 8/2013 | Takeuchi | |
| 2002/0147543 A1 * | 10/2002 | Gieseke | G08G 1/14 701/532 |
| 2003/0123703 A1 | 7/2003 | Pavlidis et al. | |
| 2004/0175058 A1 * | 9/2004 | Jojic | G06F 17/30259 382/305 |
| 2005/0025355 A1 * | 2/2005 | Simard | G06K 9/6256 382/159 |
| 2006/0215880 A1 * | 9/2006 | Berthilsson | G06K 9/00771 382/103 |
| 2008/0112630 A1 * | 5/2008 | Nestares | H04N 5/144 382/236 |
| 2009/0020233 A1 | 1/2009 | Berman et al. | |
| 2009/0021590 A1 | 1/2009 | Shimizu | |
| 2009/0322874 A1 | 12/2009 | Knutson et al. | |
| 2010/0085436 A1 | 4/2010 | Ohno | |
| 2010/0157049 A1 | 6/2010 | Dvir et al. | |
| 2011/0157358 A1 | 6/2011 | Bell | |
| 2012/0284146 A1 | 11/2012 | Wong | |
| 2013/0039532 A1 * | 2/2013 | Carbonell | G06K 9/00785 382/103 |
| 2013/0101171 A1 | 4/2013 | Bulan et al. | |
| 2013/0170696 A1 | 7/2013 | Zhu et al. | |
| 2013/0179383 A1 | 7/2013 | Pringle et al. | |
| 2013/0208134 A1 | 8/2013 | Hamalainen | |
| 2015/0123990 A1 * | 5/2015 | Satoh | H04N 5/2329 345/625 |

FOREIGN PATENT DOCUMENTS

| | | |
|---|---|---|
| EP | 1 465 414 A3 | 3/2005 |
| EP | 1 895 486 B1 | 11/2009 |
| EP | 2 079 062 B1 | 8/2010 |
| EP | 2 043 358 B1 | 5/2011 |
| WO | WO 2013/120180 A1 | 8/2013 |

* cited by examiner

VIDEO/VISION BASED ACCESS CONTROL METHOD AND SYSTEM FOR PARKING OCCUPANCY DETERMINATION, WHICH IS ROBUST AGAINST CAMERA SHAKE

FIELD OF THE INVENTION

Embodiments are generally related to parking management systems. Embodiments also relate to techniques for providing real-time parking occupancy data. Embodiments also relate to video and vision based image processing based on pre-defined regions of interest.

BACKGROUND

Parking management systems are being proposed that provide real-time parking occupancy data to drivers to reduce fuel consumption and traffic congestion. In the context of parking occupancy determination, a hybrid method of video-based and vision-based access control system has been developed, which utilizes restricted analyses in video and vision processing based on pre-defined regions of interest to gain the efficiency and accuracy needed for real-time application. An example of such a hybrid approach is disclosed in U.S. patent application Ser. No. 13/963,200 entitled "Hybrid Method and System of Video and Vision Based Access Control for Parking Stall Occupancy Determination," which was filed on Aug. 9, 2013, and is incorporated herein by reference in its entirety.

Like many video-based systems that rely on fixed camera field of view (FOV), however, a change of FOV can cause a significant performance drop. Methods are thus needed to deal with camera FOV changes in order to improve the performance of parking management and monitoring systems under disturbances such as abrupt camera FOV changes and camera shake.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved parking management methods and systems.

It is another aspect of the disclosed embodiments to provide methods and systems for parking occupancy determination.

The aforementioned aspects and other objectives and advantages can now be achieved as described herein. Methods and systems for parking occupancy determination are disclosed. Video of an entrance to a parking lot (or other facility) can be acquired utilizing one or more video cameras focusing on a pre-defined vision-based region of interest and a pre-defined video-based region of interest. The video can be video processed via a classifier that is pre-trained to take into account potential camera shake disturbances to generate video output data thereof. The video output data can then be trajectory smoothed. The video output data (following trajectory smoothing) can then be analyzed for parking lot occupancy data such that the impact of camera shake with respect to the video camera(s) is minimized to determine parking lot occupancy.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
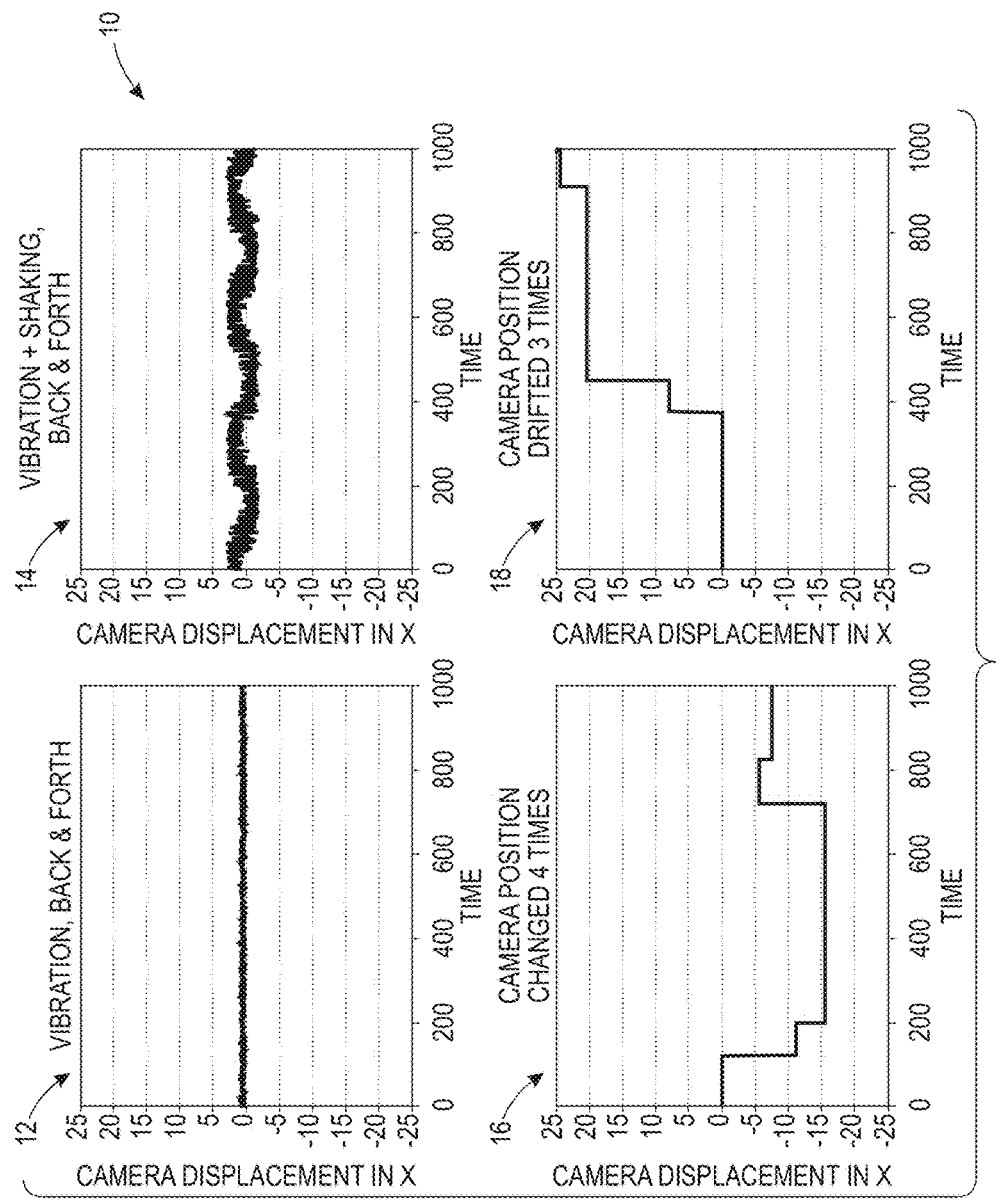
FIG. 1 illustrates example graphics depicting sample data indicative of two types of camera FOV change: shaking/vibration and orientation changes.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Throughout the following discussion, numerous references will be made regarding servers, services, engines, modules, interfaces, portals, platforms, or other systems formed from computing devices. It should be appreciated that the use of such terms are deemed to represent one or more computing devices having one or more processors configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed devices or assemblies are also deemed to comprise computing devices having a processor and a non-transitory memory storing instructions executable by the processor that cause the device to control, manage, or otherwise manipulate the features of the devices or assemblies.

Embodiments are disclosed describing and illustrating an improved video-/vision-based access control method for parking occupancy determination, which is robust against abrupt camera FOV (Field of View) changes. This can be achieved by first measuring/monitoring the camera FOV changes using template matching between templates learned from original scene(s) and the motion-removed current scene. The measured changes can then be employed to adjust the first ROI for vision-based processing, if the amount is above a pre-determined threshold. By doing so, the impact of camera FOV changes to the system performance can be minimized and thus yield an improved system against such disturbances.

Also disclosed are embodiments for video-/vision-based access control for parking occupancy determination, which is robust against camera shake. As will be explained in greater detail herein, potential camera shake level data and parameters can be explicitly included in the scope of training of, for example, a vehicle-at-entrance classifier (or other types of classifiers) for vision-based processing and in trajectory smoothing with respect to the output of vehicle tracking information obtained from video processing operations. By doing so, the impact of camera shake to system performance can be minimized to yield improved system operations against such disturbances.

The embodiments discussed herein can be implemented in the context of hybrid video-based and vision-based access control systems. The disclosed approach can employ restricted analysis in video and vision processing based on pre-defined ROIs (Regions of Interest) to obtain the efficiency and accuracy required for real-time applications. Like many video-based systems that rely on the use of a fixed camera FOV, a change of FOV can cause significant performance drops in, for example, the above-mentioned video-/vision-based systems.

The disclosed embodiments can be implemented in the context of parking management systems capable of providing real-time parking occupancy data to drivers to, for example, reduce fuel consumption and traffic congestion. In the context of parking occupancy determination, a hybrid method of video-based and vision-based access control system can be implemented. Such an approach employs restricted analyses in video and vision processing based on pre-defined regions of interest (ROIs) to gain the efficiency and accuracy needed for real-time application. However, like many video-based systems that rely on fixed camera field of view (FOV), a change of FOV can cause significant performance drop.

Two main types of camera FOV changes involve camera shaking/vibration and abrupt camera orientation changes. FIG. 1 illustrates a group 10 of graphs 12, 14, and 16, 18 depicting sample data indicative of two types of camera FOV change: shaking/vibration and orientation changes. Back and forth vibration data is depicted in graph 12, and data indicative of random vibration and systematic shaking (back and forth) is depicted in graph 14. Graph 16 illustrates data indicative of the change of camera position (4 times) and graph 18 depicts data indicative of the change of camera position (3 times).

FIG. 1 thus depicts a schematic illustration via the graph group 10 of the two categories. The key characteristic to watch for is the displacement differences between adjacent frames (not the amplitudes in the illustration). In the case of shaking/vibration, the displacement changes frame to frame. As a result, it is typically addressed via video stabilization (register frame to frame or every N frames) or via designing a system/method that is robust against it.

In the case of abrupt camera orientation changes, the displacements from frame to frame are typically the same except when those isolated disturbances occur. It is thus important to detect when these disturbances occurs and by how much. Though this can also be addressed via frame-to-frame registration, it may not worth such high frequency correction if the change is small at each occurrence but cumulated to a significant amount over a long period of time. Furthermore, high frequency correction is computational expensive and may introduce noise due to imperfect correction. In practice, the camera FOV changes would likely exhibit both types with various degrees of severity. Different applications and system factors (e.g., such as algorithm used, configuration, environments, etc.) may require different strategy to cope with them. It is thus one of the objectives of the disclosed embodiments to address these robustness issues in the context of access control for parking occupancy determination.

In a preferred embodiment, an improved video and vision based access control method for parking occupancy determination can be implemented, which is robust against camera shake. This approach improves upon, for example, the methodology and system disclosed in U.S. patent application Ser. No. 13/963,200 by explicitly including potential camera shake level in scope into the training of a vehicle-at-entrance classifier used for vision-based processing, and trajectory smoothing of the output of vehicle tracking from video processing.

Figure 2:
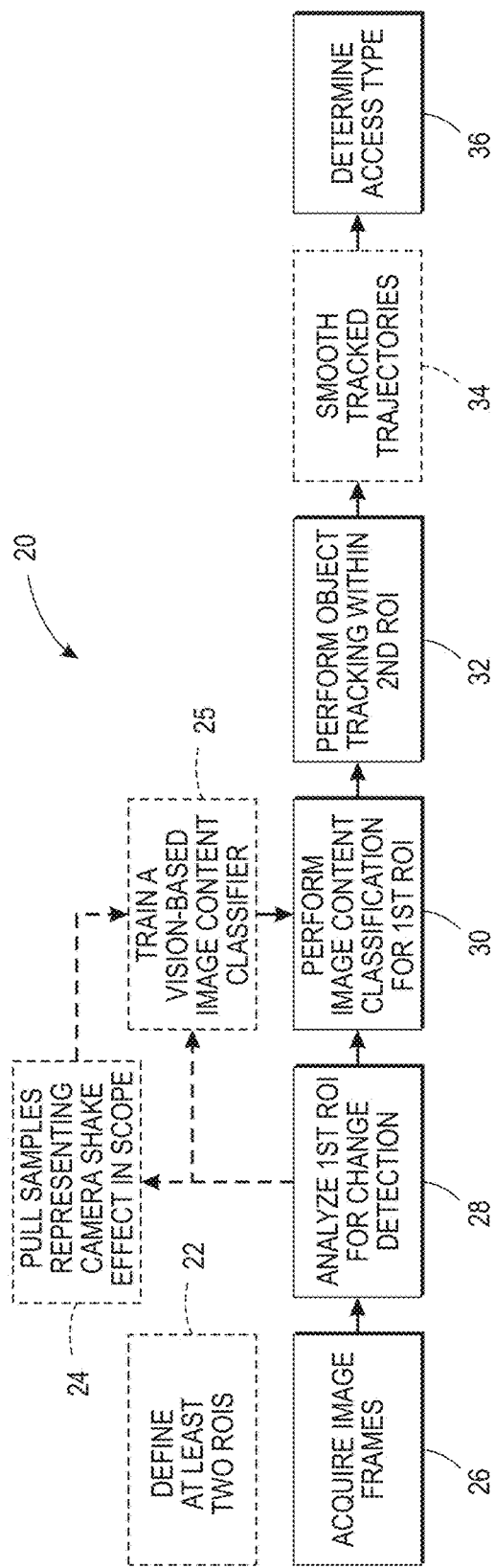
FIG. 2 illustrates a high-level flow chart of operations depicting logical operational steps of a method for video/vision-based access control for parking occupancy determination, which is robust against camera shake/vibration, in accordance with a preferred embodiment.

FIG. 2 illustrates a high-level flow chart of operations depicting logical operational steps of a method 20 for video-/vision-based access control for parking occupancy determination, which is robust against camera shake/vibration, in accordance with a preferred embodiment. An operation can be implemented to define at least two ROIs as shown at block 22. Image frames can be acquired, as indicated at block 26 and then a first ROI can be analyzed for change detection as indicated at block 28. Samples can be pulled representing camera shake effect in scope, as shown at block 24. A vision-based image content classifier can then be trained, as illustrated at block 25. Additionally, image content classification can be performed for the first ROI as shown at block 30. Object tracking within the second ROI can be performed as shown at block 32 followed by an operation for smooth tracked trajectories as shown at block 34. Finally, an operation can be implemented to determine access type, as shown at block 36.

FIG. 2 illustrates the overall process of our proposed method and illustrates where the proposed two additional processes (in red) are incorporated into a previous system. To avoid duplication, we will focus our discussion on the processes involved in these two additional modules, why and how they can contribute to the improvement of robustness against camera shake.

Figure 3:
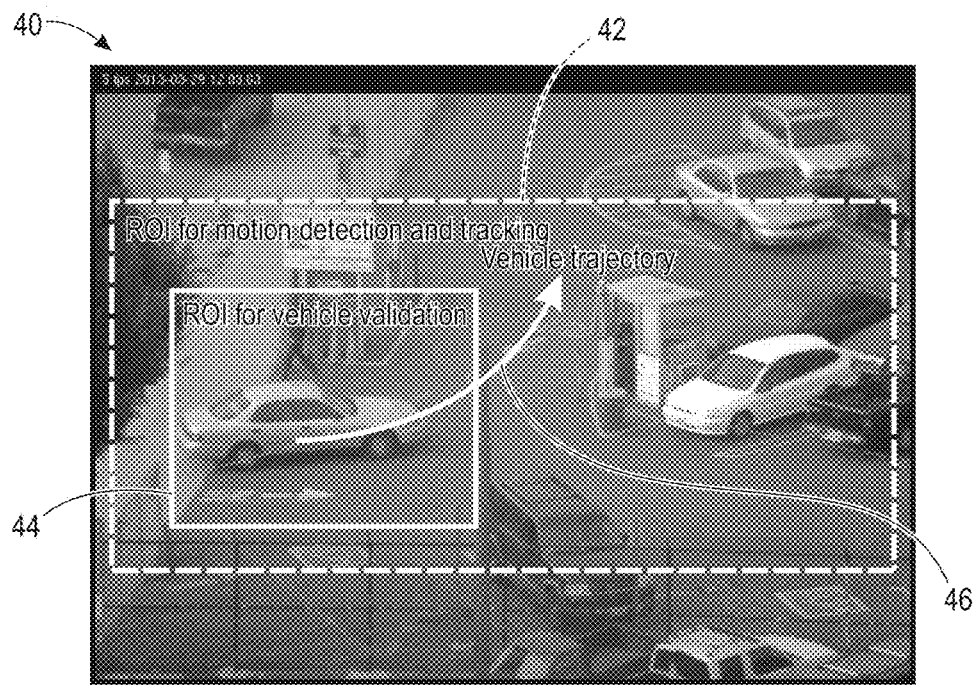
FIG. 3 illustrates an image indicative vision-based ROI and video-based ROI video processing.

FIG. 3 illustrates a sample image 40 depicting vision-based ROI and video-based ROI data, in accordance with an embodiment. The image 40 shown in FIG. 3 contains two boxes 42 and 44. The inner box 44 is labeled "ROI for vehicle validation" and the outer box 42 is labeled "ROI for motion detection and tracking". The example image 40 shown in FIG. 3 depicts a vehicle entering a parking lot. An arrow 46 in image 40 indicates the general trajectory of the vehicle. FIG. 3 illustrates how a hybrid vision-based and video-based system such as that disclosed, for example, in U.S. patent application Ser. No. 13/963,200, functions. In general, activities occurring at the entrance of a parking lot can be monitored to determine the occupancy of the particular parking lot depicted in image 40. Two ROIs can be pre-defined offline: a vision-based ROI ("ROI for vehicle validation" of box 44) and a video-based ROI ("ROI for motion detection and tracking" of box 42). A vision-based classifier can be pre-trained with data collected from the site (e.g., the parking lot) and human labeling can be implemented to determine two classes: a class with the vehicle inside ROI 44 or a class without the vehicle inside ROI 44. At run-time, when motion is detected with the ROI 44, for example, the classifier can be employed to determine if a vehicle(s) is at the entrance. If yes, video processing can be performed at the video-based ROI 42 for motion detection and/or tracking.

Finally, the vehicle trajectory indicated by the arrow 46 shown in FIG. 3 can be analyzed to determine if the event constitutes a vehicle entering the lot or exiting the lot. If the camera FOV changed noticeably, the image content of ROI 44 may change significantly enough that the pre-trained classifier fails. As a result, the system may miss some vehicle entering or exiting events thus cause inaccuracy of the system. On the other hand, the change of camera FOV has a smaller impact on tracking because motion detection is accomplished frame-to-frame. Thus, the system can quickly recover from abrupt camera FOV change. It is thus important to incorporate additional robustness into the vision-based process, but not the video-based process under this type of disturbance.

Turning now to the operation shown at block 24 of FIG. 2, samples representing camera shake in scope can be pulled to explicitly include potential camera shake level in scope into the training of a vehicle-at-entrance classifier. This operation can be performed offline and updated online if desired. In this step or logical operation, samples representing camera shake are pulled to explicitly include potential camera shake level in scope into the training of vehicle-at-entrance classifier. The process is similar to the gathering of training samples disclosed in U.S. patent application Ser. No. 13/963,200. That is, the results from analyzing the first ROI (e.g., box 44 in FIG. 3) can be analyzed for change detection to collect training (both positive and negative) samples. Such a collection method can be very effective and requires minimal human labeling efforts.

The key difference is the following: the samples collected according to the method disclosed in U.S. patent application Ser. No. 13/963,200 are simply a cropped version of the $1^{st}$ ROI (e.g., box 44 shown in FIG. 3). Instead, the disclosed approach randomly moves, rotates, scales, or warps the $1^{st}$ ROI and then crops additional training samples using the distorted ROI. This technique can capture samples representing "what if" camera shake occurs. By manipulating the distortion parameters, various levels of simulated camera shake training samples can be artificially generated. In an alternative embodiment, we can first apply various distortions that simulate camera shake effects on the image frame and then simply crop the images at the original ROI. This particular embodiment can provide more accurate representations of training samples under the influence of camera shake, but requires much more computation.

In order to appreciate the advantage of the disclosed approach, it is helpful to review some alternative approaches. One alternative approach involves performing video stabilization for every frame before any video analysis. The advantage of this approach is that no change is needed in, for example, the technique discussed in U.S. patent application Ser. No. 13/963,200. The disadvantage is that it is computationally expensive and may not be necessary for a number of applications. It also prevents us from offering real-time solution with current computational capacities.

Another straightforward approach involves incorporating these disturbances naturally from the set of training videos. That is, it must be assured that training videos are provided that exhibit the level of camera shake expected or in scope (e.g., have videos from typical days as well as reasonable windy days). The advantage is that again, no change is needed in U.S. patent application Ser. No. 13/963,200. The disadvantage is that it may take a long time to collect training videos (e.g., winter season is more windy than summer).

Another approach that is commonly used in computer vision is adding simulated training samples. The disclosed approach is somewhat similar to this approach with a distinct and key difference. This difference comes from the fact that in traditional computer vision approach, simulated training samples (typically focus on positive samples) are created by performing image manipulation of positive training samples (e.g., rotate, scale, adding noise, etc.) and then overlapping them on top of randomly selected negative (background) samples. These simulated positive training samples often have unnatural boundaries around the interface where distorted images and randomly selected background merge. Note that the term computer vision in its simplest terms is the field of "teaching machines how to see." A coal of computer vision is to make computers efficiently perceive, process, and understand visual data such as images and videos and includes machine learning applications. The term vision-based or vision based as utilized herein refers to a component that is computer vision based.

Figure 4:
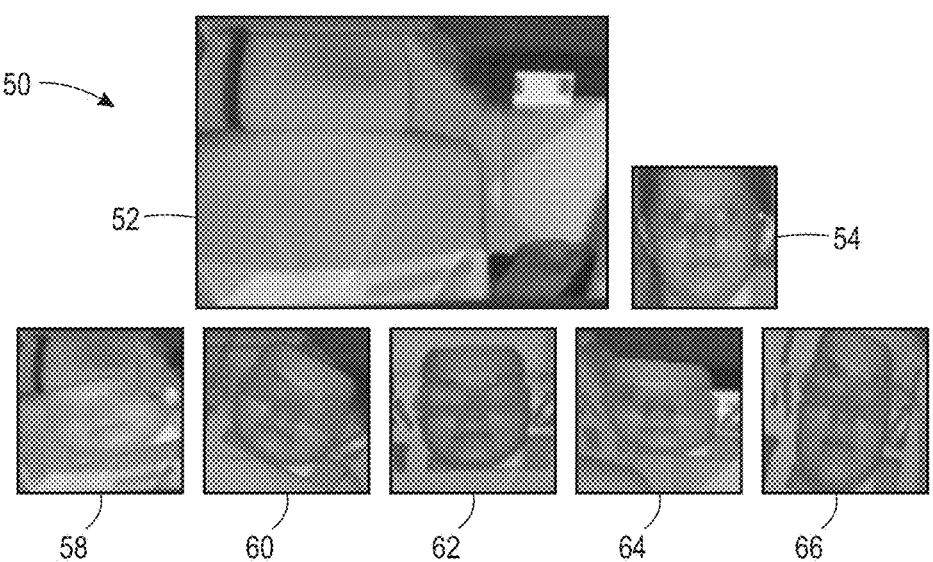
FIG. 4 illustrates a group of images of simulated train samples with respect to a background scene, an original positive training sample, and various distorted training samples.

FIG. 4 depicts an example of a simulated positive training sample in a face recognition application within a vehicle using above-mentioned traditional computer vision approach. The advantage of this approach is that it offers similar level of flexibility as our approach. However, due to the noticeable boundary that may appear in samples generated by this prior art, the trained classifier using these samples may not perform as well as the disclosed approach. FIG. 4 thus depicts a group 50 of images of simulated train samples with respect to a background scene, an original positive training sample, and various distorted training samples. Image 52, for example, depicts the interior of a car. Image 54 shows a particular face, and images 58, 60, 62, 64, 66 depict distortions of the face shown in image 54. Image 52 is thus a background scene (i.e. a passenger seat of a vehicle) and image 54 is an original positive training sample. Images 58, 60, 62, 64, 66 depict various distorted training samples.

The first approach (i.e. through frame to frame image stabilization) involves providing enhanced input to a system, while the remaining approaches involves increasing system robustness without altering the inputs by providing more training samples that encompass various levels of camera shake in scope. The latter may result in a trade-off of system performance for robustness. Hence, it is important not to exaggerate the level of camera shake involved and build in unnecessary robustness. The disclosed approach, on the other hand, allows the flexibility to control level of camera shake in scope and to update or change that level easily via re-training the classifier or selecting from a set of pre-trained classifiers.

Turning now to the operation depicted at block 34 of FIG. 2, a step can be performed for generating and calculating smooth tracked trajectories of a vehicle from video processing. This step can be performed online. In this operation, a simple trajectory smoothing technique can be applied to the output of vehicle tracking from video processing in, for example, the system or technique of U.S. patent application Ser. No. 13/963,200. This would remove the impact of high-frequency camera shake, but may not remove the impact of lower frequency component in camera shake. Hence, this should only be an auxiliary step. But since the computational cost is very minimal, it is desired to have this step in the system.

From a high-level point of view, the disclosed embodiment of FIG. 2 can utilize image frame simulation to provide additional training (both positive and negative) samples to vision-based processing (e.g., in U.S. patent application Ser. No. 13/963,200) and thus improve the system robustness. Via parameter settings, the disclosed approach offers the flexibility to incorporate desired level of camera shake into the robustness. This is important since increasing system robustness often require trade-off system performance. Since additional training samples are generated from processing training videos offline, one can first store a large set of training samples that cover a wide range of camera shake levels in the database and then pull samples as needed for retraining the vision-based classifier of, for example, the system of U.S. patent application Ser. No. 13/963,200. Alternatively, a plurality of classifiers can be pre-trained offline that cover a wide range of camera shake levels; and at run-time, appropriate pre-trained classifier may be selected based on a level of camera shake in scope. By doing so, a dynamic system can be implemented, which provides a needed level of robustness over time based on the conditions in hand.

From the perspective of training sample generation/simulation, the disclosed approach differs from traditional computer vision approaches in, for example, these areas: (1) additional distorted positive samples can be merged with background seamlessly; and (2) the disclosed approach provides distorted negative samples.

An algorithm based on the disclosed embodiment was applied in a 13-hour live experimental video acquired at a pilot site on Mar. 29, 2013 and two simulated videos, which were generated by simulated two levels/types of camera shake (as illustrated in graphs 12, 14 of FIG. 1, the respective top left and right plots) frame-to-frame into the original 13-hour live video. Two versions of vision-based classifiers were pre-trained using live-videos acquired from different days. The first ("original") version is created using method of, for example, U.S. patent application Ser. No. 13/963,200, thus providing the baseline performance. The other ("augmented") version is created using the method discussed above with maximal random shifts of U[−10,10] in both directions.

Such an experiment was implemented in the context of MATLAB and tested with respect to the three videos mentioned above. In particular, video#1 is the original LADOT live video on Mar. 29, 2013, which has unknown but very minor camera shake. Video#2 is a simulated version of video#1 with random camera shake of level of U[−1,1] in both directions frame to frame (as illustrated in, for example, the left plot or graph 12 of FIG. 1). Video#3 is another simulated version of video#1 with camera shake, which includes a random shake of U[−1,1] in both directions frame to frame and a sinusoid shake (back and forth) in the x-direction with amplitude of 3 pixels and period of 4 seconds (as illustrated in the right plot or graph 14 of FIG. 1). Since the levels of camera shake are in the order of video#1, #2, #3 from small to large, we would expect that the accuracy of the original approach of U.S. patent application Ser. No. 13/963,200 applied to these videos would be in the same order from high to low. One of the goals of the disclosed method and system (i.e. use of augmented version of vision-based classifier) is to bring the accuracy back or minimize the degradation in accuracy due to additional camera shake inserted.

Figure 5:
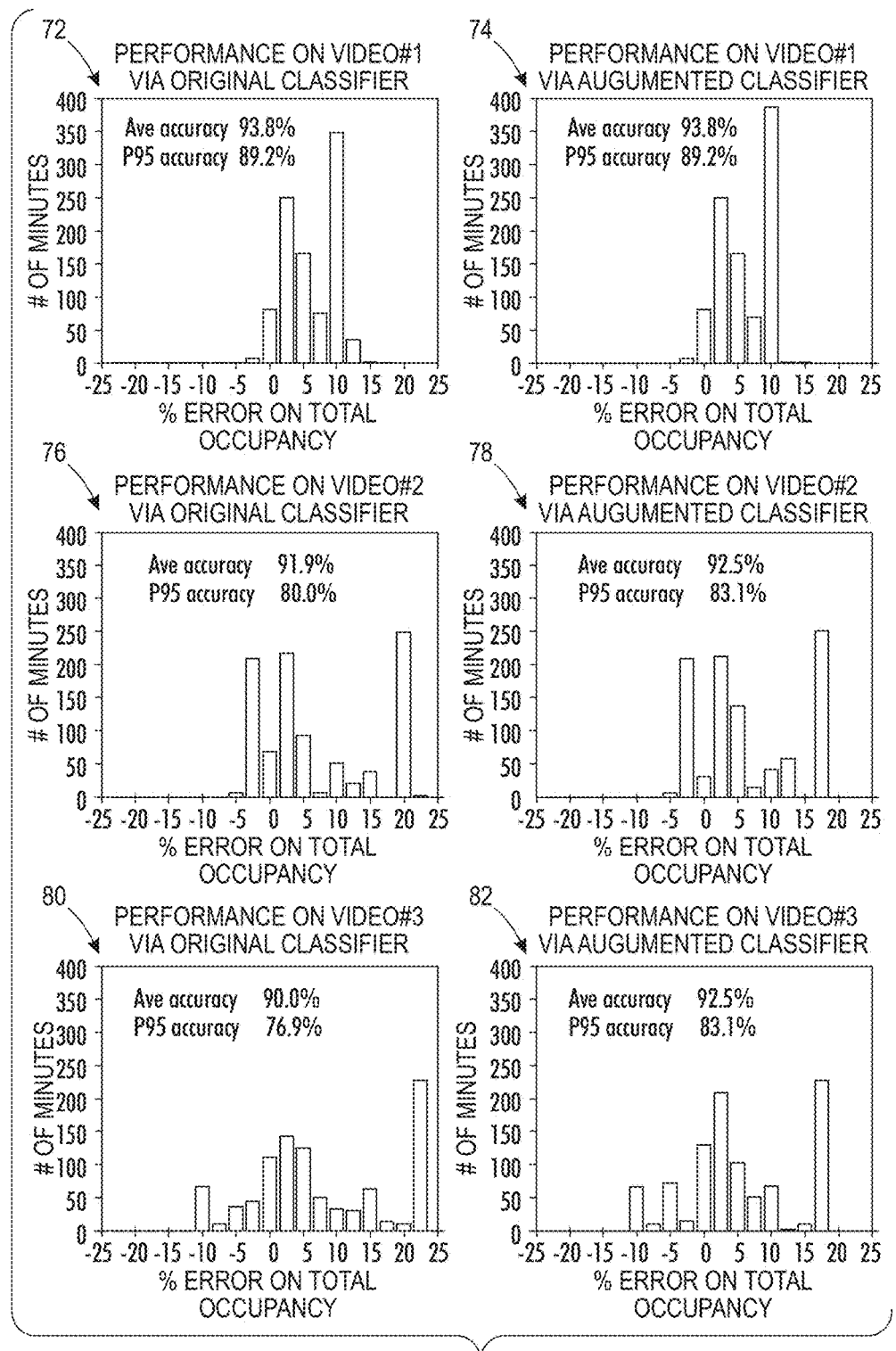
FIG. 5 illustrates a series of graphs depicting example data indicative of the performance of the prior art method and the embodiments disclosed herein.

FIG. 5 illustrates a series of graphs 72, 74, 76, 78, 80, 82 depicting example data indicative of the performance of the prior art method and the embodiments disclosed herein. FIG. 5 demonstrates the performance of the original classifier of U.S. patent application Ser. No. 13/963,200 and the disclosed approach (augmented classifier). Graph 72, for example, depicts data showing the performance with respect to video #1 as processed by the original classifier. Graph 74, on the other hand, depicts data demonstrating the performance on video #1 by the augmented classifier of the disclosed embodiments. Similarly, graph 76 plots data indicative of performance on video #2 via the original classifier and graph 78 plots data indicative of performance on video #2 with respect to the augmented classifier of the disclosed embodiments. Finally, graph 80 plots performance data with respect to video #3 via the original classifier, and graph 82 plots performance data with respect to video #3 via the augmented classifier of the disclosed embodiments.

Figure 6:
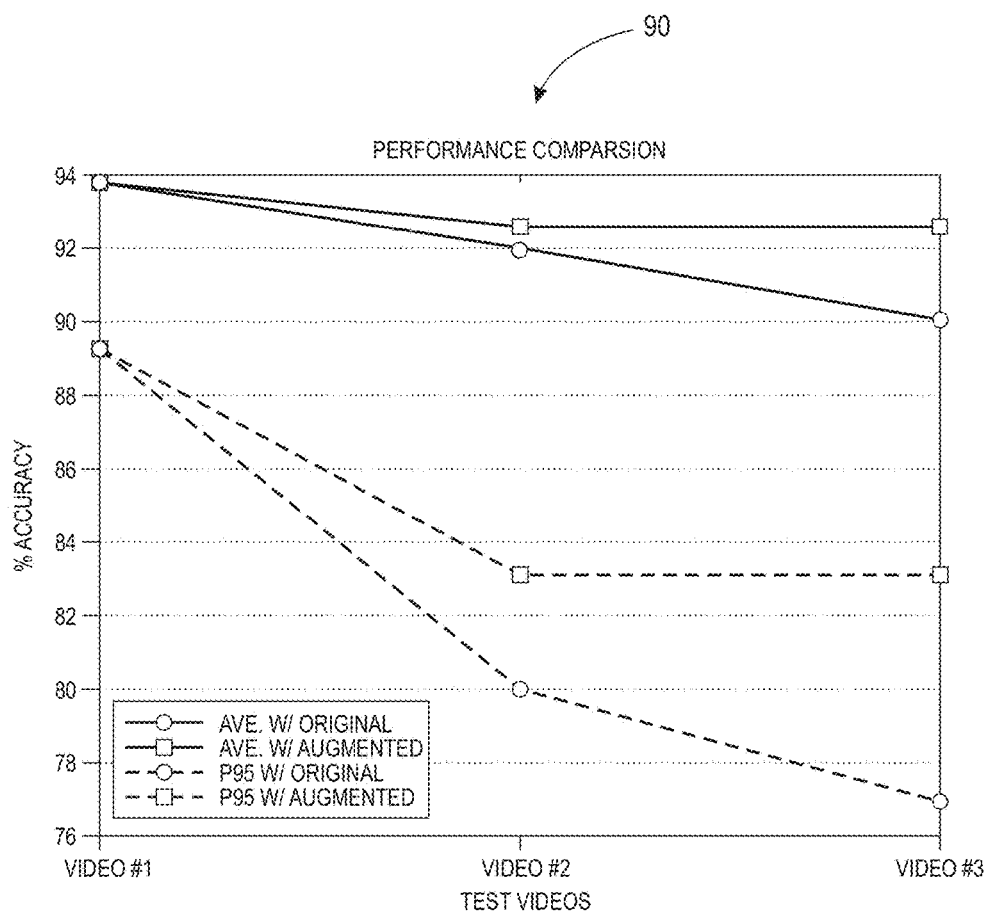
FIG. 6 illustrates a graph depicting example data comparing the performance of the prior art method and the embodiments disclosed herein.

FIG. 6 illustrates a graph 90 depicting example data comparing the performance of the prior art method and the embodiments disclosed herein. FIG. 6 shows the comparison of accuracies using the two approaches. As can be seen, though the disclosed method cannot bring the accuracy back to the original level without camera shake, the improvement over previous methods is quite clear (up to 2.5% improvement on average accuracy and up to 6% improvement on P95 accuracy). The improvement is quite significant for this application.

Figure 7:
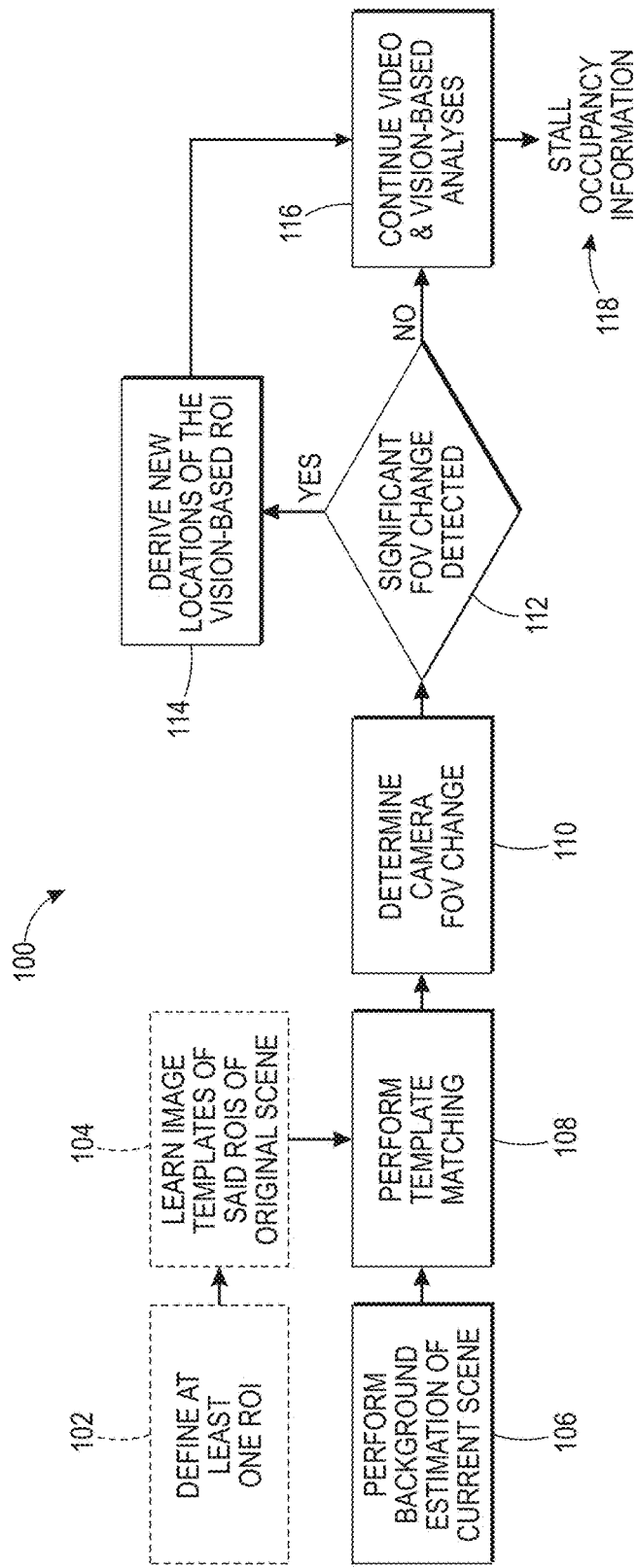
FIG. 7 illustrates a method for improving performance against abrupt camera FOV changes, in accordance with an alternative embodiment.

FIG. 7 illustrates a method 100 for improving performance against abrupt camera FOV changes, in accordance with an alternative embodiment. Method 100 takes into account the fact that in the case of abrupt camera orientation/position changes, the displacements from frame-to-frame are typically the same except when those isolated disturbances occur. It is thus important in some situations to detect when these disturbances occurs and by how much. Though this can also be addressed via frame-to-frame registration, it may not worth such high frequency correction if the change is small at each occurrence but cumulated to a significant amount over a long period of time. Furthermore, high frequency correction is computational expensive and may introduce noise due to imperfect correction.

In practice, the camera FOV changes would likely exhibit both types with various degrees of severity. Different applications and system factors (e.g., such as algorithm used, configuration, environments, etc.) may require different strategy to cope with them. It is thus one of the objectives of the disclosed embodiments to address these robustness issues in the context of access control for parking occupancy determination.

FIG. 7 thus illustrates a flow-chart of operations depicting logical operational steps of a video-/vision-based access control method 100 for parking occupancy determination, which is robust against abrupt camera FOV changes, in accordance with a preferred embodiment. As indicated at block 102, a step or logical operation can be implemented to define one or more ROIs. Thereafter, as disclosed at block 104, an operation can be implemented to learn image templates of the ROIs of an original scene. Additionally, as disclosed at block 106, a background estimation of a current scene can be performed following by a template matching operation as shown at block 108. Note that the template matching operation can be performed with respect to the data generated as a result of the operations depicted at block 104 and 106.

Following processing of the operation shown at block 108, a step or logical operation can be implemented to determine a camera FOV change as indicated at block 110. Then, as shown at decision block 112, an operation can be implemented to determine if a significant FOV change is detected. If so, then as indicated at block 114, an operation can be performed to derive new locations, including a correction of potential offsets, shearing, scaling, rotation, and other geometric transformations observed of the vision-based ROI. If not, then as shown at block 116, video and vision based analysis can be continued. Parking occupancy (e.g., parking stall occupancy) data can then be determined as shown at block 118.

The method 100 shown in FIG. 7 thus offers improved video and vision based access control for parking occupancy determination, which is robust against abrupt camera field of view (FOV) changes. The approach shown in FIG. 7 can also be summarized as follows:

1. Define at least one region of interest (ROIs) suitable for image registration (e.g., regions with distinct features or low likelihood of image content change over time, etc.) [can be performed offline];
2. Automatically learn representative image templates of the ROI(s) representing various image contents of the original scene [can be performed offline, updated online if desired];
3. Perform background estimation of current frame to yield image representing the motion-removed image content of current scene; [performed online, can reuse video processing steps disclosed, for example, in U.S. patent application Ser. No. 13/963,200];
4. Perform template matching between learned templates of the original scenes and the motion-removed current scene to find the best matches at a pre-determined schedule (e.g., every 5 minutes) [performed online];
5. Determine the amount and/or characteristics of the camera FOV changes if the template matching scores above a pre-determined threshold [performed online];
6. Derive the new pixel locations of the vision-based ROI if the determined amount exceeds a pre-determined threshold. If not, leave the pixel locations unchanged [performed online]; and
7. Continuing the video and vision-based analyses as disclosed, for example, in U.S. patent application Ser. No. 13/963,200 [performed online].

Figure 8:
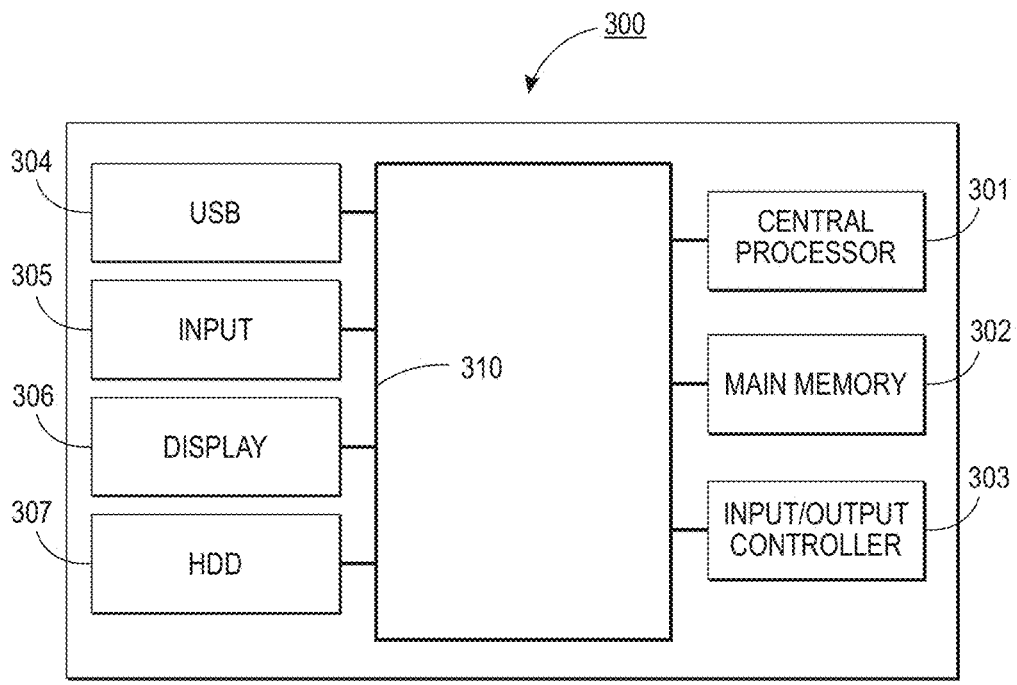
FIG. 8 illustrates a schematic view of a computer system, which can be implemented in accordance with one or more of the disclosed embodiments.
Figure 9:
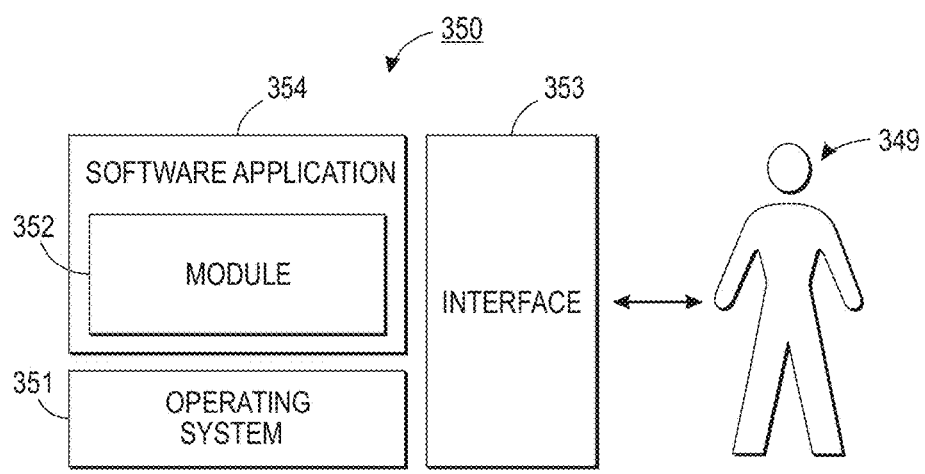
FIG. 9 illustrates a schematic view of a software system including an anomaly detection module, an operating system, and a user interface, in accordance with one or more embodiments.

FIGS. 8-9 are provided as exemplary diagrams of data-processing environments in which embodiments of the present invention may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments. Note that FIGS. 8-9 generally illustrate a data-processing system in which embodiments may be implemented (e.g., such as an "app"). FIGS. 8-9 are thus representative of a variety of different types of data-processing systems and devices including, for example, servers, laptop computers, Smartphones, "pad" or tablet computing devices, desktop computers, and other computing devices.

As illustrated in FIG. 8, the disclosed embodiments may be implemented in the context of a data-processing system 300 that can include, for example, a central processor 301 (or other processors), a main memory 302, a controller 303, and in some embodiments, a USB (Universal Serial Bus) 304 or other appropriate peripheral connection. System 300 can also include an input device 305 (e.g., a keyboard, pointing device such as a mouse, etc.), a display 306, and a HDD (Hard Disk Drive) 307 (e.g., mass storage). As illustrated, the various components of data-processing system 300 can communicate electronically through a system bus 310 or similar architecture. The system bus 310 may be, for example, a subsystem that transfers data between, for example, computer components within data-processing system 300 or to and from other data-processing devices, components, computers, etc.

FIG. 9 illustrates a computer software system 350, which may be employed for directing the operation of the data-processing system 300 depicted in FIG. 8. Software application 354, stored in memory 302 and/or on HDD 307 generally can include and/or can be associated with a kernel or operating system 351 and a shell or interface 353. One or more application programs, such as module(s) 352, may be "loaded" (i.e., transferred from mass storage or HDD 307 into the main memory 302) for execution by the data-processing system 300. In the example shown in FIG. 9, module 352 can be implemented as, for example, a software module that can perform one or more of the logical instructions or operations disclosed herein.

The data-processing system 300 can receive user commands and data through user interface 353 accessible by a user 349. These inputs may then be acted upon by the data-processing system 300 in accordance with instructions from operating system 351 and/or software application 354 and any software module(s) 352 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 352) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type.

Modules may be composed of two parts: an interface, which lists the constants, data types, variable, and routines that can be accessed by other modules or routines, and an implementation, which is typically private (e.g., accessible only to that module) and which includes source code that actually implements the routines in the module. The term module may also simply refer to an application such as a computer program designed to assist in the performance of a specific task such as word processing, accounting, inventory management, etc.

The interface 353 (e.g., a graphical user interface) can serve to display results, whereupon a user may supply additional inputs or terminate a particular session. In some embodiments, operating system 351 and interface 353 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 351 and interface 353.

FIGS. 8-9 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments are disclosed. For example, in one embodiment, a method can be implemented for parking occupancy determination. Such a method can include the steps or logical operations of, for example: acquiring video of an entrance to a parking lot utilizing one or more video cameras focusing on a pre-defined vision-based region of interest and a pre-defined video-based region of interest; video processing the video via at least one classifier pre-trained to take into account potential camera shake disturbances to generate video output data thereof; and analyzing the video output data for parking lot occupancy data, wherein an impact of camera shake with respect to the video camera(s) is minimized to determine parking lot occupancy.

In another embodiment, steps or logical operations can be provided for applying distortions that simulate camera shake effects with respect to at least one image frame; and cropping the at least one image frame at an original region of interest. In yet another embodiment, a step or logical operation can be implemented for trajectory smoothing the video output data. In another embodiment, a step or logical operation can be provided for tracking at least one vehicle within the video of the entrance to the parking lot utilizing the at least one classifier.

In still another embodiment, a step or logical operation can be provided for video processing the video at the pre-defined video-based region of interest for motion detection and/or tracking, if motion is detected within the pre-defined vision-based region of interest. In another embodiment, a step or logical operation can be implemented for analyzing the video for a vehicle trajectory of the at least one vehicle to determine if the at least one vehicle is entering or exiting the parking lot. In yet another embodiment, a step or logical operation can be implemented for pre-training the at least one classifier based on pulled samples indicative of camera shake in scope to include the potential camera shake disturbances into the at least one classifier.

In another embodiment, steps or logical can be provided for randomly moving, rotating, scaling, and/or warping the pre-defined vision-based region of interest; and cropping the training samples to capture samples indicative of the camera shake. In another embodiment, a step or logical operation can be provided for manipulating distortion parameters to generate a plurality of varying levels of simulated camera shake samples for use as the training samples.

In another embodiment, steps or logical operations can be provided for measuring or estimating an amount of the camera shake at least one of image processing with respect to video frames of the video, the use of a gyroscope, and/or a motion detection device; and selecting an appropriate pre-trained classifier among the at least one classifier to take into account the potential camera shake disturbances to generate the video output data thereof.

In still another embodiments, steps or logical operations can be implemented for measuring changes in a field of view using template matching between templates derived from at least one original scene and at least one current scene with motion removed; and employing the changes measured in the field of view to adjust data indicative of at least one region of interest for vision-based processing thereof if the changes measured are above a pre-determined threshold so that an impact of the changes with respect so the field of view to performance is minimized and determine the parking lot occupancy.

In another embodiment, a system for parking occupancy determination can be implemented. Such a system can include in some embodiments, for example: a processor and a computer-usable medium embodying computer program code, the computer-usable medium capable of communicating with the processor. The aforementioned computer program code can include instructions executable by the processor and configured, for example, for acquiring video of an entrance to a parking lot utilizing at least one video camera focusing on a pre-defined vision-based region of interest and a pre-defined video-based region of interest; video processing the video via at least one classifier pre-trained to take into account potential camera shake disturbances to generate video output data thereof; and analyzing the video output data for parking lot occupancy data, wherein an impact of camera shake with respect to the video camera(s) is minimized to determine parking lot occupancy.

In another embodiment, such instructions can be further configured for trajectory smoothing the video output data. In yet another embodiment, such instructions can be further configured for tracking at least one vehicle within the video of the entrance to the parking lot utilizing the at least one classifier. In another embodiment, such instructions can be further configured for video processing the video at the pre-defined video-based region of interest for motion detection and/or tracking, if motion is detected within the pre-defined vision-based region of interest. In yet another embodiment, such instructions can be further configured for analyzing the video for a vehicle trajectory of the at least one vehicle to determine if the at least one vehicle is entering or exiting the parking lot. In still another embodiment, such instructions can be further configured for pre-training the at least one classifier based on pulled samples indicative of camera shake in scope to include the potential camera shake disturbances into the at least one classifier.

In another embodiment, such instructions can be further configured for randomly moving, rotating, scaling, and/or warping the pre-defined vision-based region of interest; and cropping the training samples to capture samples indicative of the camera shake. In still another embodiment, such instructions can be further configured for manipulating distortion parameters to generate a plurality of varying levels of simulated camera shake samples for use as the training samples.

In still another embodiment, a processor-readable medium storing code representing instructions to cause a process for parking occupancy determination can be implemented. Such code can include code to, for example: acquire video of an entrance to a parking lot utilizing at least one video camera focusing on a pre-defined vision-based region of interest and a pre-defined video-based region of interest; video process the video via at least one classifier pre-trained to take into account potential camera shake disturbances to generate video output data thereof; and analyze the video output data for parking lot occupancy data, wherein an impact of camera shake with respect to the video camera(s) is minimized to determine parking lot occupancy.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for parking occupancy determination, said method comprising:
    acquiring video of an entrance to a parking lot utilizing at least one video camera focusing on a computer vision-based region of interest for vehicle validation and a video-based region of interest for motion detecting and tracking;
    video processing said video via at least one classifier trained with data collected from said parking lot and to take into account potential camera shake disturbances to generate video output data thereof, wherein said at least one classifier comprises at least one computer vision-based image content classifier;
    analyzing said video output data for parking lot occupancy data, wherein an impact of camera shake with respect to said at least one video camera is minimized to determine parking lot occupancy;
    determining an access type with respect to said parking lot based on said parking lot occupancy data, after analyzing said video output data for said parking lot occupancy data;
    configuring said at least one classifier to comprise said computer vision-based image content classifier that performs image content classification for the computer vision-based region of interest and assists in object tracking with respect to said video-based region of interest;
    applying distortions that simulate camera shake effects with respect to at least one image frame;
    cropping said at least one image frame at an original region of interest after said applying said distortions that simulate said camera shake effects with respect to said at least one image frame;
    incorporating said potential camera shake disturbances into training of said at least one classifier used for computer vision-based processing for said computer vision-based region of interest for vehicle validation and used for trajectory smoothing said video output data to remove an impact of high-frequency components during said camera shake disturbances;
    measuring changes in a field of view of said video using template matching between templates derived from at least one original scene and at least one current scene with motion removed; and
    employing said changes measured in said field of view to adjust data indicative of at least one region of interest for computer vision-based processing thereof if said changes measured are above a pre-determined threshold so that an impact of said changes with respect so said field of view to performance is minimized and determine said parking lot occupancy.

2. The method of claim 1 wherein said video processing said video further comprises video processing said video via a data-processing system comprising a server.

3. The method of claim 2 further comprising:
    tracking at least one vehicle within said video of said entrance to said parking lot utilizing said at least one classifier.

4. The method of claim 2 further comprising:
    tracking at least one vehicle within said video of said entrance to said parking lot utilizing said at least one classifier; and
    wherein video processing said video via said at least one classifier further comprises: video processing said video at said video-based region of interest for motion detecting and tracking, if motion is detected within said computer vision-based region of interest for vehicle validation.

5. The method of claim 1 wherein said video processing said video further comprises video processing said video via a data-processing system comprising a smartphone or a tablet computing device.

6. The method of claim 1 further comprising tracking at least one vehicle within said video of said entrance to said parking lot utilizing said at least one classifier.

7. The method of claim 6 wherein video processing said video via said at least one classifier further comprises:
    video processing said video at said video-based region of interest for motion detecting and tracking, if motion is detected within said computer vision-based region of interest for vehicle validation.

8. The method of claim 7 further comprising analyzing said video for a vehicle trajectory of said at least one vehicle to provide an indication of whether or not said at least one vehicle is entering or exiting said parking lot.

9. The method of claim 7 further comprising training said at least one classifier based on pulled samples indicative of camera shake in scope to include said potential camera shake disturbances into said at least one classifier.

10. The method of claim 9 further comprising:
    randomly moving, rotating, scaling, and warping said computer vision-based region of interest for vehicle validation; and
    cropping said training samples to capture samples indicative of said camera shake.

11. The method of claim 10 further comprising manipulating distortion parameters to generate a plurality of varying levels of simulated camera shake samples for use as said training samples.

12. A system for parking occupancy determination, said system comprising:
    a processor; and
    a computer-usable medium embodying computer program code, said computer-usable medium capable of communicating with the processor, said computer program code comprising instructions executable by said processor and configured for:

acquiring video of an entrance to a parking lot utilizing at least one video camera focusing on a computer vision-based region of interest for vehicle validation and a video-based region of interest for motion detecting and tracking;

video processing said video via at least one classifier trained with data collected from said parking lot and to take into account potential camera shake disturbances to generate video output data thereof, wherein said at least one classifier comprises at least one computer vision-based image content classifier;

tracking at least one vehicle within said video of said entrance to said parking lot utilizing said at least one classifier:

analyzing said video output data for parking lot occupancy data, wherein an impact of camera shake with respect to said at least one video camera is minimized to determine parking lot occupancy;

determining an access type with respect to said parking lot based on said parking lot occupancy data, after analyzing said video output data for said parking lot occupancy data;

incorporating said potential camera shake level considerations into training of said at least one classifier used for computer vision-based processing for said computer vision-based region of interest for vehicle validation and used for trajectory smoothing said video output data to remove an impact of high-frequency components in said camera shake;

video processing said video at said pre-defined video-based region of interest for motion detection and tracking, if motion is detected within said pre-defined vision-based region of interest;

analyzing said video for a vehicle trajectory of said at least one vehicle to determine if said at least one vehicle is entering or exiting said parking lot;

training said at least one classifier based on pulled samples indicative of camera shake in scone to include said potential camera shake disturbances into said at least one classifier;

deriving new pixel locations with respect to said computer vision-based region of interest for said vehicle validation if a determined amount exceeds a pre-determined threshold, and if said amount does not exceed said pre-determined threshold, leave pixel locations unchanged with respect to said computer vision-based region of interest for vehicle validation;

wherein said computer vision-based region of interest for vehicle validation is contained within said video-based region of interest for motion detecting and tracking;

randomly moving, rotating, scaling, and warping said computer vision-based region of interest; and cropping said training samples to capture said samples indicative of said camera shake.

13. The system of claim 12 further comprising a data-processing system comprising said processor that communicates with an HDD (Hard Disk Drive).

14. The system of claim 12 further comprising a data-processing system comprising a server comprising said processor.

15. The system of claim 12 further comprising a tablet computing device comprising said processor or a smartphone comprising said processor.

16. The system of claim 12 wherein said instructions are further configured for manipulating distortion parameters to generate a plurality of varying levels of simulated camera shake samples for use as said training samples.

* * * * *